(12) United States Patent
Rutgers et al.

(10) Patent No.: US 11,573,162 B2
(45) Date of Patent: Feb. 7, 2023

(54) ACTIVE DENSITY METER

(71) Applicant: Alia Instruments Holding B.V., Enschede (NL)

(72) Inventors: Petrus Theodorus Rutgers, Hengelo (NL); Jan Peters, Apeldoorn (NL)

(73) Assignee: Alia Instruments Holding B.V., Enschede (NL)

( * ) Notice: Subject to any disclaimer, the term of this patent is extended or adjusted under 35 U.S.C. 154(b) by 0 days.

(21) Appl. No.: 17/261,090

(22) PCT Filed: Jul. 18, 2019

(86) PCT No.: PCT/EP2019/069329
§ 371 (c)(1),
(2) Date: Jan. 18, 2021

(87) PCT Pub. No.: WO2020/016339
PCT Pub. Date: Jan. 23, 2020

(65) Prior Publication Data
US 2021/0318219 A1 Oct. 14, 2021

(30) Foreign Application Priority Data
Jul. 19, 2018 (EP) ..................................... 18184394

(51) Int. Cl.
G01N 9/00 (2006.01)
(52) U.S. Cl.
CPC ....... G01N 9/002 (2013.01); *G01N 2009/006* (2013.01)
(58) Field of Classification Search
CPC .......... G01F 1/84; G01F 1/8468; G01F 1/849; G01F 1/8409; G01F 1/8413; G01N 2009/006; G01N 9/002; G01N 9/02; G01N 9/04; G01N 9/06
See application file for complete search history.

(56) References Cited

U.S. PATENT DOCUMENTS

| 5,321,991 A * | 6/1994 | Kalotay ................ G01F 1/8431 73/861.357 |
| 6,412,354 B1 | 7/2002 | Birchak et al. |
| 7,290,447 B1 | 11/2007 | Burnette et al. |
| 2016/0290908 A1* | 10/2016 | De Vries .................. G01N 9/06 |
| 2016/0334316 A1 | 11/2016 | Cage et al. |
| 2018/0113014 A1 | 4/2018 | Singer et al. |

FOREIGN PATENT DOCUMENTS

| EP | 0722084 A1 | 7/1996 |
| WO | 2012118775 A2 | 9/2012 |
| WO | 2015069100 A2 | 5/2015 |

* cited by examiner

*Primary Examiner* — John Fitzgerald
*Assistant Examiner* — Truong D Phan
(74) *Attorney, Agent, or Firm* — The Webb Law Firm

(57) ABSTRACT

The present disclosure relates to a density meter for slurry which is transported through a pipe, the density meter may include a frame; a pipe part; flexible pipe couplings arranged between the frame and either end of the pipe part for coupling the pipe part to the frame and to a feed pipe and a discharge pipe; a first accelerometer arranged on the pipe part for measuring the accelerations of the pipe part; an actuator arranged between the pipe part and the frame for imparting force on the pipe; a controller for controlling the actuator; and a computing means having a mathematical model to ultimately calculate the density of the slurry in the pipe part.

19 Claims, 2 Drawing Sheets

ACTIVE DENSITY METER

CROSS-REFERENCE TO RELATED APPLICATIONS

This application is the United States national phase of International Application No. PCT/EP2019/069329 filed Jul. 18, 2019, and claims priority to European Patent Application No. 18184394.7 filed Jul. 19, 2018, the disclosures of which are hereby incorporated by reference in their entirety.

BACKGROUND OF THE INVENTION

Field of the Invention

The present disclosure relates to a density meter for slurry which is transported through a pipe, the density meter comprising:
- a frame;
- a pipe part;
- flexible pipe couplings arranged between the frame and either end of the pipe part for coupling the pipe part to the frame and to a feed pipe and a discharge pipe, which pipe couplings impart to the pipe part at least one degree of freedom relative to the feed pipe and the discharge pipe and relative to the frame;
- a first accelerometer arranged on the pipe part for measuring the accelerations of the pipe part in the direction of the at least one degree of freedom.

Description of Related Art

Such a density meter is known from the EP 3066450. This known device uses a force sensor to measure the weight of the pipe part including the weight of the slurry in the pipe part, while the accelerometer is used to determine whether the density meter is moving in the direction of the force sensor, which would influence the readings of the force sensor. Based on the registered force and acceleration as well as the known volume and weight of the pipe part, the density of the slurry in the pipe part can be determined.

Although the known density meter provides a sufficient accuracy for a number of applications, it is desired to increase the accuracy of such a density meter. Therefore it is an object of the invention to provide an improved density meter.

This object is achieved with a density meter according to the preamble, which is characterized by
- an actuator arranged between the pipe part and the frame for imparting a force on the pipe;
- a controller for controlling the actuator with a multi-frequency signal;
- computing means having a mathematical model, which computing means fit, in an operational mode, while the controller controls the actuator, the accelerations measured by the first accelerometer on the mathematical model to determine at least one parameter of the mathematical model and which computing means calculate the density of the slurry in the pipe part with the determined at least one parameter.

SUMMARY OF THE INVENTION

With the density meter according to the invention, a force is imparted onto the pipe part by controlling the actuator with a multi-frequency signal, such that a number of forces with a varying duration and amplitude is exerted onto the pipe part. The accelerometer will register the response of the pipe part on these varying forces. The measured accelerations will then be fitted onto the mathematical model in order to determine at least one parameter of the mathematical model, such that the mathematical model approaches the measured accelerations. Then based on the determined at least one parameter, the density of the slurry is calculated. The function to calculate said density is dependent on the used mathematical model and will be apparent.

With the density meter according to EP 3066450 the density was determined in a passive way by measuring the force exerted by the pipe part and accelerations of outside influences causing the density meter to move.

With the density meter according to the invention, the density is determined by actively exerting forces onto the pipe part by controlling the actuator. The forces onto the actuator provide accelerations of the pipe part, which are partly dependent on the density of the slurry in the pipe part.

Due to the active controlling of the actuator with a multi-frequency signal and the use of a mathematical model on which the measured accelerations are fitted, the accuracy of the density measurement is increased. Due to the fitting onto the model for example a varying flexibility of the couplings due to temperature changes can be filtered out.

The pipe part can be rigid or flexible or can be composed out of flexible and rigid pipe portions. The mathematical model should take into account an approximation of the used pipe part construction.

A preferred embodiment of the density meter according to the invention further comprises a second and a third accelerometer each arranged on the frame adjacent to one of the flexible pipe couplings, wherein the accelerations measured by the second and third accelerometer are also fitted onto the mathematical model to determine the at least one parameter.

By arranging accelerometers on both ends of the density meter, i.e. at the location where the density meter is connected to the outside world, such as the feed and discharge pipe, the effect of the movement of the frame can be taken into account when computing the density of the slurry with the mathematical model.

In yet a further preferred embodiment of the density meter according to the invention the computing means calibrate the calculation of the density of the slurry in the pipe part with the determined at least one parameter in an initialization mode, while having a known density in the pipe part.

By supplying a slurry or fluid with known density into the pipe part, it is possible to calibrate the density meter in mounted state. By controlling the actuator and measuring the response of the pipe part, the measured accelerations can be fitted onto the mathematical model in order to determine the at least one parameter. Then the at least one parameter is used to calculate the density. As a slurry or fluid with known density is used, the calculated density can be compared with the known density and calibration data can be determined. This calibration data is finally used, when the density meter is used in operational mode. This allows for (re)calibration of the density meter, after the density meter has been installed in a slurry installation.

In a further embodiment of the density meter according to the invention, the pipe part comprises a rigid, for example steel, pipe part portion and the flexible pipe couplings comprise a flexible sleeve, for example a rubber hose part.

The advantage of having a rigid pipe part coupled by flexible pipe couplings, is that the mathematical model can be less complicated allowing for lower computing power in the density meter, while still having accurate density measurements.

It is even further preferred when the pipe part comprises two rigid pipe part portions connected by a flexible pipe part portion. This would correspond closely to a mathematical model composed out of an elongate mass being suspended on each end by a spring and a damper arranged parallel to each spring.

Yet another embodiment of the density meter according to the invention further comprises a removable, flexible liner extending through the flexible pipe couplings and the pipe part.

The flexible liner provides a protective layer against the abrasive effect of the slurry running through the density meter. Having the liner removable allows for an easy exchange of a worn liner by a new liner without having to disassemble the density meter itself.

The invention also relates to a combination of a density meter according to the invention, a feed pipe and a discharge pipe, wherein the pipe part of the density meter is arranged with one pipe coupling on the feed pipe and is arranged with the other pipe coupling on the discharge pipe.

The invention also relates to a method for calibrating a density meter according to the invention, which method comprises the steps of:
feeding a first fluid with known density to the pipe part;
controlling the actuator with the multi-frequency signal;
fitting the accelerations measured by the accelerometer(s) onto the mathematical model to determine at least one parameter of the mathematical model;
calculating the density of the fluid in the pipe part with the determined at least one parameter;
determining calibration data by comparing the known density with the calculated density;
repeating the steps with further fluids of different densities.

With the method according to the invention calibration data is obtained to improve the accuracy of the calculation of the density of the fluid, such that in the operational mode of the density meter according to the invention the density of a slurry flowing through the density meter can be calculated more accurately.

For the calibration method fluids with known densities are used, such as water, glycerin and air.

Using more different fluids with different densities allows for the calibration data to be more accurate and accordingly for the calculation of the density to be more accurate.

BRIEF DESCRIPTION OF THE DRAWINGS

These and other features of the invention will be elucidated in conjunction with the accompanying drawings.

DESCRIPTION OF THE INVENTION

Figure 1:
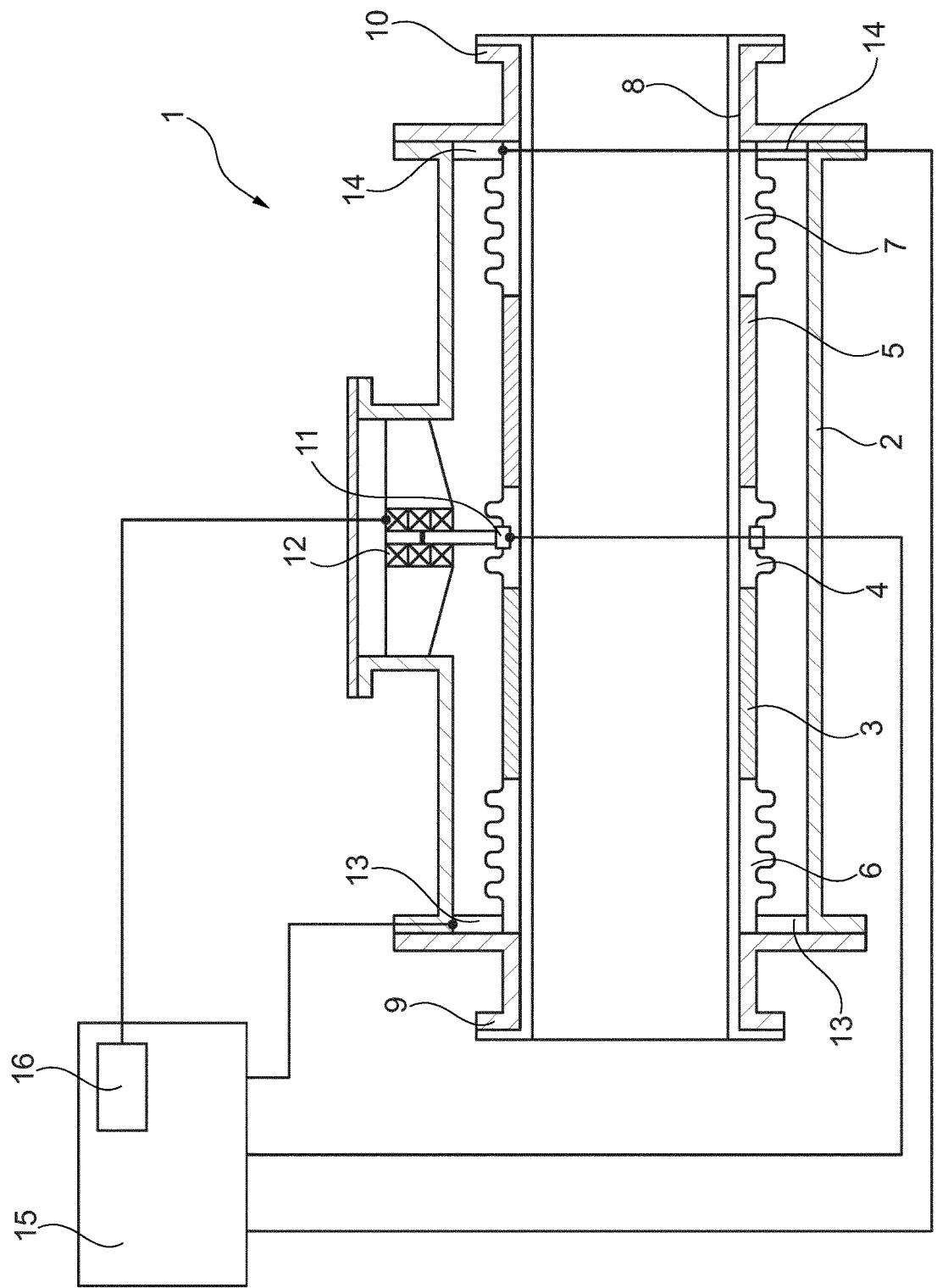
FIG. 1 shows a schematic cross sectional view of an embodiment of a density meter according to the invention.

FIG. 1 shows a density meter 1 having a frame 2 in which a pipe part 3, 4, 5 is arranged. The pipe part 3, 4, 5 is composed out of two rigid pipe portions 3, 5 connected by a flexible pipe portion 4. The pipe part 3, 4, 5 is connected to the frame 2 via flexible pipe couplings 6, 7. A removable flexible liner 8 extends through the pipe part 3, 4, 5 and the flexible couplings 6, 7 to provide a wear protection for the pipe part 3, 4, 5 and the couplings 6, 7. In order to connect either a feed pipe or discharge pipe each free end of the frame 2 has a flange parts 9, 10.

A first accelerometer 11 is arranged to the flexible pipe part 4, as well as an actuator 12 mounted to the frame 2. The actuator 12 is preferably an electrical coil with a shaft provided with a magnet such that the actuator 12 can exert a force dependent on the current flowing through the electrical coil and independent on the displacement of the shaft of the actuator 12.

In order to enhance the density meter 1, a second accelerometer 13 is arranged to the flange part 9 and a third accelerometer 14 is arranged to the flange part 10.

The density sensor 1 has furthermore computing means 15 incorporating a controller 16 for controlling the actuator 12. The three accelerometers 11, 13, 14 are all connected to the computing means 15, such that on the basis of the actuation of the actuator 12 with a multi-frequency signal and the response signals of the three accelerometers 11, 13, 14, the density of the slurry flowing through the pipe part 3, 4, 5 can be computed.

Figure 2:
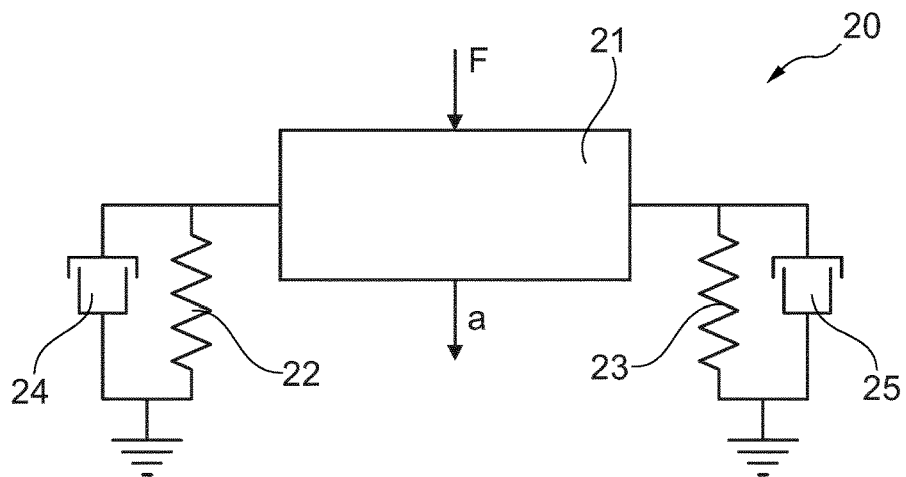
FIG. 2 shows a schematic representation of the mathematical model for the embodiment of FIG. 1.

FIG. 2 shows a schematic representation of the mathematical model 20, which is used by the computing means 12. The mathematical model 20 has a mass 21 and on both ends of the mass 21 a spring 22, 23 and damper 24, 25 are arranged in parallel. This mathematical model 20 represents the pipe part 3, 4, 5 and flexible couplings 6, 7.

By registering the acceleration a by the accelerometer 11, the mathematical model 20 can be fitted and one or more parameters of the mathematical model can be determined. With these determined parameters the density of the slurry flowing through the pipe part 3, 4, 5 can be computed.

Figure 3:
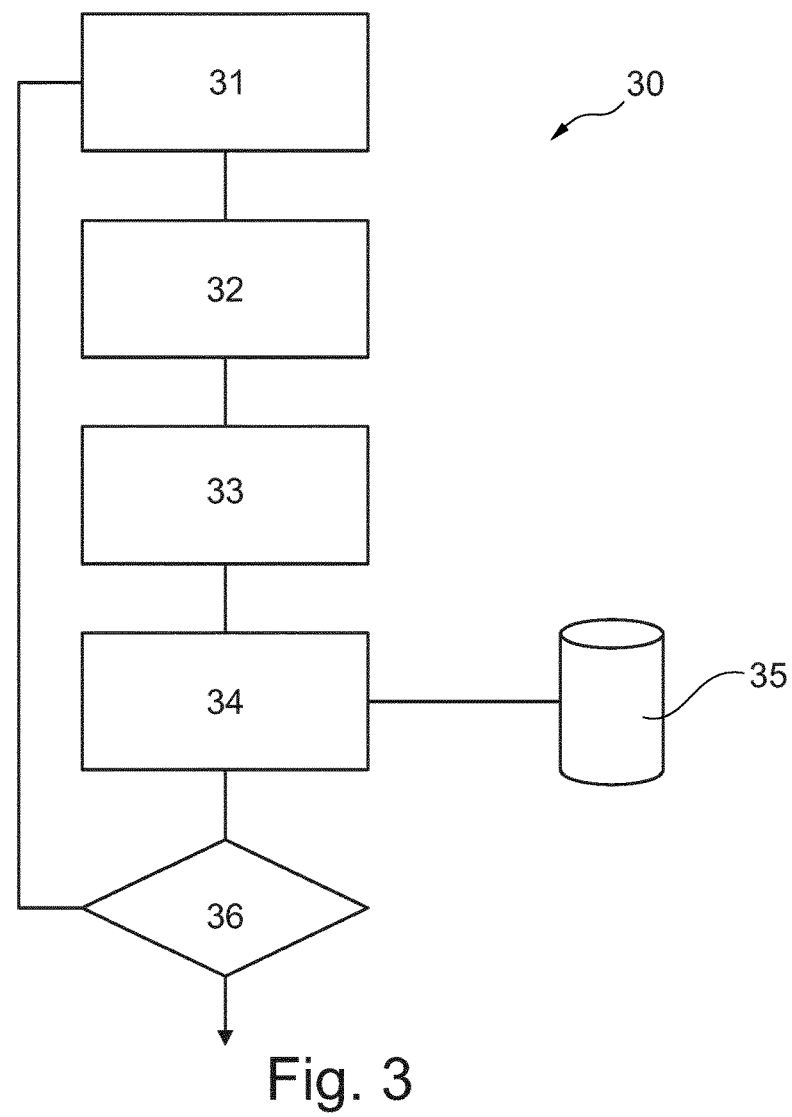
FIG. 3 shows a diagram of the steps of the method according to the invention for calibrating the density meter of FIG. 1.

FIG. 3 shows a diagram 30 of an embodiment of the method for calibrating a density sensor 1 as shown in FIG. 1. This calibration method can be used in an initialization mode of the density meter 1, after the density meter 1 is already installed in a slurry installation.

In the first step 31 a fluid with a known density is fed to the pipe part 3, 4, 5. Then in step 32 the actuator 12 is controlled by the controller 16 with a multi frequency or white noise signal, such that the pipe part 3, 4, 5 is moved by a varying force.

In step 33 the measurements of the accelerometers 11, 13, 14 are used to fit the mathematical model 20 to determine one or more parameters of the mathematical model 20. In step 34 the determined parameters are used to calculate the density of the fluid and this calculated density is compared to the known density in order to determine calibration data, which is stored in a storage 35 for use in operational mode.

In step 36 a further fluid with a known density is selected, if available, and the steps 31-34 are repeated to provide further calibration data.

The invention claimed is:
1. A density meter for slurry which is transported through a pipe, the density meter comprising:
a frame;
a pipe part;
flexible pipe couplings arranged between the frame and either end of the pipe part for coupling the pipe part to the frame and to a feed pipe and a discharge pipe, in which the pipe couplings impart to the pipe part at least one degree of freedom relative to the feed pipe and the discharge pipe and relative to the frame;
a first accelerometer arranged on the pipe part for measuring accelerations of the pipe part in a direction of the at least one degree of freedom;

an actuator arranged between the pipe part and the frame for imparting a force on the pipe;

a controller for controlling the actuator with a multi-frequency signal; and computing means having a mathematical model, wherein the computing means fit, in an operational mode, while the controller controls the actuator, the accelerations measured by the first accelerometer on the mathematical model to determine at least one parameter of the mathematical model and wherein the computing means calculate the density of the slurry in the pipe part with the determined at least one parameter.

2. The density meter according to claim 1, further comprising a removable, flexible liner extending through the flexible pipe couplings and the pipe part.

3. A combination of a density meter according to claim 1, a feed pipe and a discharge pipe, wherein the pipe part of the density meter is arranged with one pipe coupling on the feed pipe and is arranged with the other pipe coupling on the discharge pipe.

4. A method for calibrating a density meter according to claim 1, the method comprising the steps of:

feeding a first fluid with known density to the pipe part;
controlling the actuator with the multi-frequency signal;
fitting the accelerations measured by the accelerometer(s) onto the mathematical model to determine at least one parameter of the mathematical model;
calculating the density of the fluid in the pipe part with the determined at least one parameter;
determining calibration data by comparing the known density with the calculated density; and
repeating the steps with further fluids of different densities.

5. The density meter according to claim 1, wherein the computing means calibrate the calculation of the density of the slurry in the pipe part with the determined at least one parameter in an initialization mode, while having a known density in the pipe part.

6. The density meter according to claim 5, wherein the pipe part comprises a rigid pipe part portion, and wherein the flexible pipe couplings comprise a flexible sleeve.

7. The density meter according to claim 5, further comprising a removable, flexible liner extending through the flexible pipe couplings and the pipe part.

8. The density meter according to claim 1, further comprising a second and a third accelerometer each arranged on the frame adjacent to one of the flexible pipe couplings, wherein accelerations measured by the second and third accelerometer are also fitted onto the mathematical model to determine the at least one parameter.

9. The density meter according to claim 8, wherein the computing means calibrate the calculation of the density of the slurry in the pipe part with the determined at least one parameter in an initialization mode, while having a known density in the pipe part.

10. The density meter according to claim 8, wherein the pipe part comprises a rigid pipe part portion, and wherein the flexible pipe couplings comprise a flexible sleeve.

11. The density meter according to claim 8, further comprising a removable, flexible liner extending through the flexible pipe couplings and the pipe part.

12. The density meter according to claim 1, wherein the pipe part comprises a rigid pipe part portion, and wherein the flexible pipe couplings comprise a flexible sleeve.

13. The density meter according to claim 12, wherein the mathematical model is composed out of an elongate mass being suspended on each end by a spring and a damper arranged parallel to each spring.

14. The density meter according to claim 12, wherein the rigid pipe part portion comprises steel.

15. The density meter according to claim 12, wherein the flexible pipe couplings comprise a flexible sleeve comprise a rubber hose part.

16. The density meter according to claim 12, wherein the mathematical model is composed out of an elongate mass being suspended on each end by a spring and a damper arranged parallel to each spring.

17. The density meter according to claim 12, further comprising a removable, flexible liner extending through the flexible pipe couplings and the pipe part.

18. The density meter according to claim 12, wherein the pipe part comprises two rigid pipe part portions connected by a flexible pipe part portion.

19. The density meter according to claim 18, further comprising a removable, flexible liner extending through the flexible pipe couplings and the pipe part.

* * * * *